United States Patent [19]

Hampton et al.

[11] Patent Number: 5,062,911

[45] Date of Patent: Nov. 5, 1991

[54] PREPARATION OF CERAMIC HONEYCOMB STRUCTURE HAVING SELECTIVELY SEALED CHANNELS

[75] Inventors: Leslie E. Hampton, Corning; David F. Thompson, Painted Post, both of N.Y.

[73] Assignee: Corning Incorporated, Corning, N.Y.

[21] Appl. No.: 454,524

[22] Filed: Dec. 21, 1989

[51] Int. Cl.⁵ .............................................. C04B 37/00
[52] U.S. Cl. ....................................... 156/89; 156/253; 427/126.2
[58] Field of Search ............... 264/56, 61, 67, 177.12, 264/259, DIG. 48, 40.1; 55/523; 156/89, 250, 253; 427/126.1, 126.2

[56] References Cited

U.S. PATENT DOCUMENTS

| | | | |
|---|---|---|---|
| 4,041,591 | 8/1977 | Noll et al. | 29/157 |
| 4,283,210 | 8/1981 | Mochida et al. | 55/523 |
| 4,329,162 | 5/1982 | Pitcher, Jr. | 55/523 |
| 4,557,773 | 12/1985 | Bonzo | 156/64 |
| 4,846,657 | 7/1989 | Chao | 264/177.12 |

FOREIGN PATENT DOCUMENTS 0042301 10/1984 European Pat. Off. .

Primary Examiner—Jan H. Silbaugh
Assistant Examiner—Christopher A. Fiorilla
Attorney, Agent, or Firm—Gary H. Levin; Richard N. Wardell

[57] ABSTRACT

Ceramic honeycomb structures having channels that are selectively sealed at alternate faces of the honeycomb are prepared by applying an end cap made up of green ceramic material to each face of a green ceramic honeycomb body, followed by exposing the openings of certain channels of the honeycombs through the cap at one face and exposing the remaining channels through the cap at the other face. Thereafter, the composite capped structure is fired. The honeycombs are useful in a variety of filtering, separating, or concentrating operations in which a work fluid or component thereof is intended to pass through the walls of the channels.

11 Claims, 1 Drawing Sheet

1

PREPARATION OF CERAMIC HONEYCOMB STRUCTURE HAVING SELECTIVELY SEALED CHANNELS

BACKGROUND OF THE INVENTION

This invention relates to the preparation of a ceramic honeycomb structure having channels that are selectively sealed at alternate faces of the honeycomb. The honeycombs are useful in a variety of filtering, separating, or concentrating operations in which a work fluid or component thereof is intended to pass through the walls of the channels.

The use of ceramic honeycomb structures as fluid filters, particulate traps, or catalytic converters is longstanding. In such traditional uses of a ceramic honeycomb, the existence of a liquid head or pressure gradient is employed to drive a fluid through the end-to-end channels of the honeycomb or, in the case of some gases, through the channel walls themselves, where contact is effected with the high surface area of the ceramic substrate or with catalytic materials deposited thereon. See, for example, U.S. Pat. No. 4,631,267 (issued Dec. 23, 1986, to Lachman et al) disclosing preparation of ceramic honeycomb catalyst support structures designed for catalytic conversion of gases at sites along the walls of the open channels, and U.S. Pat. No. 4,283,210 (issued Aug. 11, 1981, to Mochida et al) disclosing a ceramic honeycomb filter designed for passage of the work gas through the channel walls.

In those ceramic honeycomb structures designed for passage of the work gas or some component thereof through the channel walls, the otherwise open channel must be selectively and alternately sealed at one end or the other to prevent the gas from merely passing through the channel itself. Generally, the preparation of a honeycomb with such alternately sealed channels cannot be accomplished in a single extrusion step and requires at least one further operation performed on a green or fired open-channelled honeycomb. For example, such a process is shown in U.S. Pat. No. 4,283,210, in which the selective sealing of channels is effected by bending and bonding the partition walls of given channels at one of the end faces of a green ceramic honeycomb body, and performing the same operation to the remaining channels at the other end face of the body.

Published European Patent Specification No. 42,301 also discloses a ceramic honeycomb body having selectively sealed channels prepared by fitting a sealing member onto each end face of a green open-channeled honeycomb body, each sealing member having a plurality of openings corresponding to alternate channel openings of the honeycomb such that each channel will be blocked at one or the other of its ends. It is taught that the sealing members and the green honeycomb are separately dried before the sealing members are fitted to the honeycomb body itself, preferably by means or an organic adhesive, a glass material, or a ceramic material, followed by standard firing of the composite so formed. U.S. Pat. No. 4,329,162 also discloses ceramic honeycomb filters in which selective seals are provided to the inlet and outlet channels by injecting a sinterable material or other sealing cement into the appropriate ends of the channels to form a "checkerboard" array of open/-closed channels at each end face.

Although the art is familiar with methods for preparing ceramic honeycomb structures with selectively sealed channels, there remains a need for other practical methods for forming integral, hermetically sealed caps at the channel ends.

SUMMARY OF THE INVENTION

The present invention provides a method for the preparation of a ceramic honeycomb body having selectively sealed channels for use in operations in which a fluid or component of the fluid is intended to be passed through the partition walls of a multi-channeled honeycomb. The starting point for the preparation method is a green ceramic honeycomb body, as prepared by methods known in the art, which body has an inlet face and an outlet face and a plurality of substantially parallel channels extending through the honeycomb between the faces. According to the method, a moistened, substantially flat, green ceramic body is then fitted against each of said faces of the honeycomb to form a substantially integral end cap over the faces, resulting in the sealing of the channel openings therein. The openings of given channels at the inlet face are then exposed through the end cap thereon, and the openings of the remaining channels at the outlet face are exposed through the end cap thereon, and the resulting composite body is then fired, thereby sintering together the honeycomb body and its two end caps to form a composite honeycomb in which given channels are hermetically sealed at the inlet face but open at the outlet face, and the remaining channels are hermetically sealed at the outlet face but open at the inlet face. In a preferred embodiment of this method, the ceramic material of the end caps and that of the honeycomb body itself are chosen so as to have substantially similar thermal expansion properties, and more preferably are the same ceramic material. In a further preferred embodiment, the composite honeycombs are coated with an electrically conductive material to form one electrode connecting the inlet face and the channels open to that face and a second electrode connecting the outlet face and the channels open to it. Structures of this embodiment are useful in the process of oxygen concentration or as fuel cells.

DETAILED DESCRIPTION OF THE INVENTION

Figure 1:
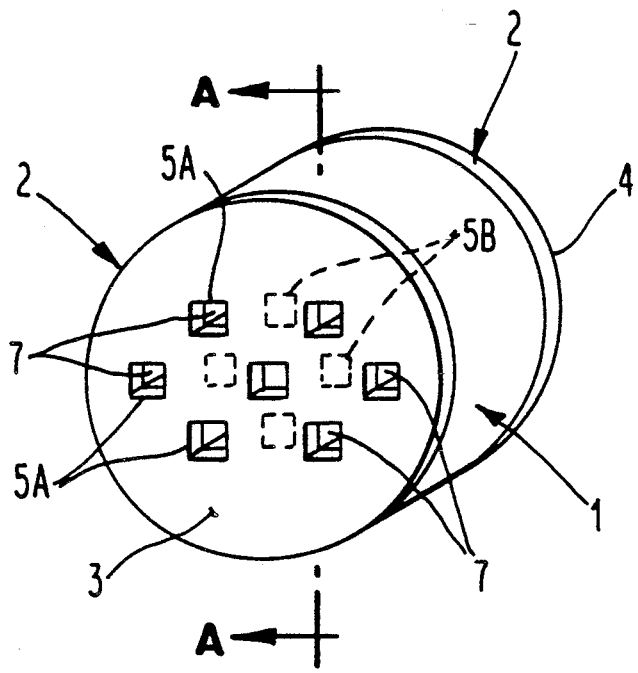
FIG. 1 is a perspective view of a ceramic composite honeycomb of the invention having selectively sealed channels.

The present invention provides a practical and efficient method for the preparation of ceramic honeycombs having channels that are hermetically sealed at one face or the other of the honeycomb. In the honeycombs provided by this invention, certain of the channels are inlet channels for a stream of work fluid and the remaining channels are outlet channels for the filtered work stream or components thereof that have passed through the channel partition walls. The honeycombs are useful as filters, particulate traps (such as for diesel engines), or catalyst structures and supports, or as the solid electrolyte medium for fuel cells or gas concentrators or detectors, or in other operations in which a fluid work stream or components of the stream are intended to pass through the partition walls of a honeycomb According to the general concept of the method, a green ceramic honeycomb having a plurality of through-and-through channels is capped with a substantially flat green body at each of its faces to seal all the channels. The openings of certain channels are then exposed through the cap at one face of the honeycomb and the remaining channels are exposed at the other face. Thereafter, the composite capped structure is fired to sinter the base honeycomb and its end caps into a substantially integral body. (As used herein, "green" refers to the state of the constituent ceramic materials, generally admixed together with binders and molded, prior to beinq fired or sintered.)

The starting green ceramic honeycomb can be composed of any of the porous metal oxide materials that are well known to those skilled in the art for their moldability and sinterability into a structure having good mechanical strength and thermal properties. Examples are zirconia, alumina, titania, cordierite, mullite, clay (preferably kaolin clay), talc, spinels, silicates such as lithium alumino-silicates, aluminates, aluminum titanate, aluminum titanate solid solutions, silica, glasses, and glass ceramics. Any mixture or combination of these materials can also be used.

The most preferred material for preparation into the starting green honeycomb of this invention is zirconia, preferably mixed with an oxide of calcium, magnesium, or yttrium in an amount that will wholly or partially stabilize the zirconia upon firing. Zirconia is "wholly" or "partially" stabilized depending upon whether the amount of this stabilizing oxide is sufficient to form a cubic phase solid solution with all or only part of the zirconia. For calcia, as little as 4 weight percent, based on the total calcia and zirconia weight, is sufficient to partially stabilize the zirconia, and about 10 weight percent is generally sufficient to fully stabilize it. For magnesia and yttria, the corresponding ranges are about 3-21% by weight and about 4-16% by weight respectfully. A material that is most easily processed according to the present invention is zirconia admixed with at least about 10 weight percent yttria and most preferably an amount of yttria sufficient to fully stabilize the zirconia Preferably the starting zirconia material has a residual silica content of not more than about 0.3 weight percent.

Preparation of the green body is accomplished by methods normally practiced in the ceramics art. In a preferred method, the constituent ceramic materials are admixed into a substantially homogeneous batch with about 1-30% by weight, based on the total batch weight, of a temporary binder. The constituent ceramic materials are generally in particulate form, preferably of a size finer than 75 microns, and more preferably in a size finer than about 50 microns. Any binder material conventionally used in ceramic catalyst support manufacture is suitable. Preferred are binders that are decomposed and burned-off at temperatures of about 250°-600° C. Examples are disclosed in: "Ceramic Processing Before Firing," ed/ by George Y. Onoda, Jr. & L. L. Hench, John Wiley & Sons, New York; "Study of Several Groups of Organic Binders Under Low-Pressure Extrusion," C. C. Treischel & E. E. Emrich, Jour..Am.Cer.Soc. (29), pp. 129-132, 1946; "Organic (Temporary) Binders for Ceramic Systems," S. Levine, Ceramic Age, (75) No. 2, pp. 39+, January 1960; and "Temporary Organic Binders for Ceramic Systems" S. Levine, Ceramic Age, (75) No. 2, pp. 25+, February 1960. A most preferred binder is methyl cellulose, one example of which is METHOCEL A4M, available from the Dow Chemical Co.

Mixing of the batch ingredients is preferably performed in a step-wise procedure in which any initially dry ingredients are first blended together. This preliminary dry-blending operation can be performed in any conventional mixing equipment but the use of an intensive mixer having both barrel and mixing blade rotation is preferred. The dry mixture is then plasticized by being further mixed, preferably in a mix muller, with a liquid medium (preferably water) which acts as a plasticizer. During this stage, any remaining constituents are added. Up to about 1% by weight, based upon total mixture weight, of a surfactant such as sodium stearate can also be added to facilitate mixing and flow for subsequent processing. Mixing of all constituents should be continued until a homogeneous or substantially homogeneous plasticized mass is obtained.

The plasticized batch is ultimately formed into the desired "green" honeycomb shape, preferably by extrusion through a die or by injection molding. The monolithic honeycomb so-formed generally has two substantially flat surfaces or "faces" (together comprising, as hereinafter referred to, an "inlet face" and an "outlet face") and a plurality of substantially parallel open channels that extend longitudinally through the honeycomb between the faces. The transverse cross-sectional configuration of the channels is generally of any rounded (i.e. circular or elliptical) or polygonal (i.e., triangular; rectangular, preferably square; or hexagonal) shape. Generally the honeycomb contains 50-1000, more preferably about 100-400, of these through-and-through channels per square inch of inlet face surface area. The transverse cross-sectional configuration of the honeycomb itself is preferably circular, elliptical, or hexagonal. Depending on its ultimately intended use, as those skilled in the art will recognize, the honeycomb can be shallower or deeper than it is wide.

With respect to preparation of a green honeycomb made from the preferred stabilized zirconia material, the batch includes, as the ceramic materials, zirconia and sufficient magnesia, calcia, or yttria to provide the desired level of stabilization as described above. The magnesia, calcia, or yttria component can be added in the form of a precursor compound, usually a salt, that is heat-decomposable to the metal oxide itself Examples of such precursor compounds are the metal oxylates, nitrates, carbonates, and acetates, and in the case of yttrium, the chloride salt as well. The amount of precursor used is that which, after ultimate firing of the honeycomb structure, will generate an amount of corresponding stabilizing metal oxide, relative to the zirconia, that is sufficient to wholly or partially stabilize the zirconia as described above.

The zirconia and stabilizing metal oxide materials are preferably added to the batch in a particulate form finer than 10 microns, and preferably less than 1 micron. Where the starting zirconia material has an average particle size greater than about 3 microns, a sintering aid can optionally be added to the batch in an amount of about 0.5-3.0 weight percent. Preferred sintering aids are those that, upon firing and formation of the cubic zirconia, tend to form crystalline mullite or magnesium-aluminate spinel at the cubic grain boundaries. The batch also contains about 3 weight percent of a temporary organic binder.

In all cases, the extruded or injection-molded green honeycomb shape is generally dried at about 100°−120°

C., preferably by steam heat, to impart some rigidity and structural strength to the honeycomb for further processing according to the invention.

The green honeycomb thus formed is next fitted at each face with an end cap, formed of a body of a green ceramic material, in order to seal the channel openings. The end caps are each prepared from a batch of plasticized ceramic material that is formed, for example by means of a press die or extrusion die, into a substantially flat body of a size and shape sufficient to completely cover the faces of the honeycomb. It is preferred that the end cap be about as thick as the partition walls that define the honeycomb channels and separate them from each other. This dimension is most preferably about 5-75 mils (about 0.013-0.19 cm). The ceranuc mixture used to form the end caps is preferably, but need not be, the same material from which the honeycomb itself is made and is most preferably taken from the same batch. When a different ceramic material is used, however, it is preferred that it be a ceramic that sinters at substantially the same temperature as the honeycomb ceramic material and has a coefficient of thermal expansion over the range of room temperature to its sintering temperature that is not more than about 10% different from the coefficient of thermal expansion of the honeycomb ceramic material. The shaped end caps will preferably not be dried prior to their application to the faces of the honeycomb but rather will be allowed to retain a plasticized consistency. In this state, the moisture content of the material is generally about 10-13% by weight.

According to this step of the invention, each face of the dried green honeycomb is wetted, preferably with water, to re-plasticize the ceramic material at the face, and a still-wet end cap body is then firmly fitted onto each face with sufficient force to integrate the plasticized ceramic material of each into a substantially continuous phase. Any excess material from the end cap that extends beyond the sides of the honeycomb itself as a result of this pressing operation can be trimmed off so that the edges of the end caps are flush with the sides of the honeycomb.

The end caps are then selectively perforated to expose the openings of certain channels of the underlying honeycomb at the inlet face and the openings of the remainder of the channels at the outlet face of the honeycomb. This can be effected by manual perforation of the end caps by a hand-held punch or tool having a pin that is sized and shaped appropriately to pierce the end cap in a manner congruent with the size and shape of the channel openings to be exposed. Preferably, however, this operation will be carried out automatically by, for example, imaging analysis in which an array of piercing pins, controlled by a processor connected to optical or other scanning means, is used to pierce the end caps to expose the desired openings. The scanning means can optionally be equipped with a "penetrating" component such as an ultrasound or x-ray device, for location of the channels after the end cap has been applied. In the absence of such a component, the faces of the honeycomb will be scanned, and signals corresponding to the location of the channels processed and stored, prior to fitting of the end caps. Such automatic operation using an array of process tools or pins is particularly well suited for use when the selectively exposed channels at each face are to be regularly spaced such as in a "checkerboard" pattern or in a pattern of alternating rows of channels. A suitable method and apparatus for control and piercing by image analysis is disclosed in U.S. Pat. No. 4,557,773 (issued Dec. 10, 1985, to Bonzo), which is hereby incorporated by reference.

Following perforation of the end caps, the composite structure is then fired to harden and densify the material and to integrally join the end caps to the material of the honeycomb body itself. Most preferably the firing is performed at a temperature and for a time sufficient to effect actual sintering of the ceramic material. The exact firing schedule, as those skilled in the art will recognize, will be dictated primarily by the identity of the ceramic materials. With particular respect to the preferred embodiment of this invention, in which both the honeycomb itself and the end caps are composed of yttria-stabilized zirconia, a preferred firing schedule is to heat the material to a temperature of about 1400° C. over a 35 hour period; further heat from that temperature to a sintering temperature of about 1650°-1800° C., preferably about 1750° C., over a 16-hour period; hold the material at the sintering temperature for about 4 hours; cool the material to about 1000° C. over a 20-hour period; and then further cool the material from that temperature back to room temperature over about a 10-hour period.

Figure 2:
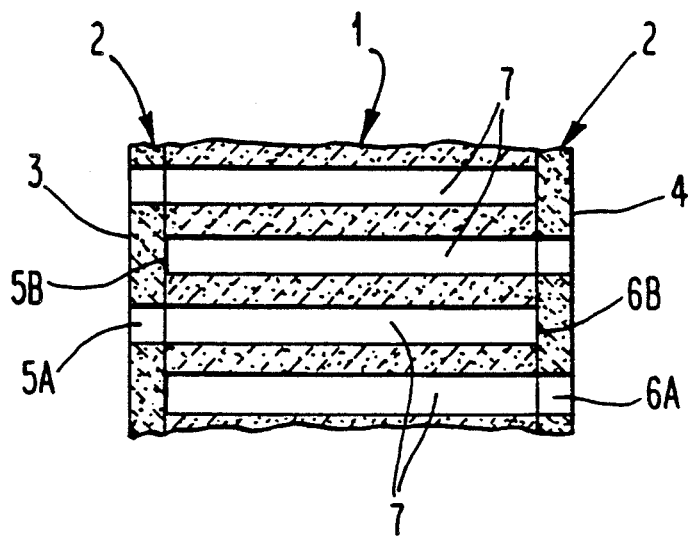
FIG. 2 is a partial cross-section of the honeycomb of FIG. 1 a long line A—A.

An example of a honeycomb thus formed with selectively sealed channels is shown in FIGS. 1 and 2. In those figures, the honeycomb, designated generally as 1, has two end caps 2 adhering to and, upon firing and sintering, integrally forming a part of inlet face 3 and outlet face 4 of the honeycomb. The end caps 2 are shown in exaggerated outline to indicate their disc-like shape. It will be understood, however, that after firing or sintering, the end caps will be integrally sealed to the honeycomb itself and there will generally be no discernible boundary between them, particularly when the end caps are of the same ceramic composition as the honeycomb. The honeycomb has a plurality of channels 7, shown here in square cross-section, separated by thin partition walls, shown unnumbered. In FIGS. 1 and 2, the cross-sectional size of the channels has been exaggerated, and few channels shown, for sake of clear illustration. Selected channels are blocked at inlet face 3 by unpierced portions of the end cap, a indicated generally by blocked openings 5B, but are open at outlet face 4, as shown generally at 6A. The remaining channels are oppositely blocked at outlet face 4, as indicated generally at 6B, but open at inlet face 3, as shown generally at 5A. The general configuration of selectively blocked channels in FIGS. 1 and 2 forms a "checkerboard" pattern.

The honeycombs formed by the method of this invention are useful for any of the filtering or separation operations heretofore performed by honeycomb structures that have been designed for passage of the work fluid, or some component thereof, through the channel partition walls rather than end-to-end through the open channels themselves. A novel application of such honeycombs, however, takes advantage of the high surface area and solid electrolyte properties of certain ceramic materials and is directed to use of honeycombs formed by this invention as oxygen concentrators or fuel cells. Accordingly, in a further embodiment of the invention, the honeycombs having selectively sealed channels as described above are coated with an electrically conductive material in a manner to connect the interior walls of the channels that are open at the inlet face and form from them a first electrode, and connect the interior walls of the channels that are open at the outlet face and form from them a second electrode. In the operation of an oxygen concentrator made by the present method, air is introduced into the channels open at the inlet face, a first voltage is applied to the interior walls of those channels, and a second voltage is applied to the interior walls of the channels open at the outlet face, thereby creating an electrical potential across the ceramic material separating adjacent inlet-open and outlet-open channels. This electrical potential forces oxygen ions from the air through the channel walls, and concentrated oxygen is released into the outlet-open channels and collected at the outlet face.

In the practice of this embodiment of the invention, the ceramic material selected for the preparation of the honeycomb body and the end caps is one which, prior to sintering, has a surface area of at least about 1.5 m²/g and which functions as a solid electrolyte that is permeable to oxygen ions but not to other components of air. Examples are stabilized zirconia, preferably yttria-stabilized zirconia as described above, β-alumina, and mullite.

The electrically conductive material is applied to composite honeycomb by conventional methods in a manner which will provide the inlet face and the interior walls of the inlet-open channels with a continuous coating, thereby forming a first electrode surface, and which will provide the outlet face and the interior walls of the outlet-open channels with a separate continuous coating, thereby forming a second, separate electrode surface. Necessary characteristics of the electrode material are permeability to oxygen and stability and durability under operating conditions, which will generally be in the range of about 600°–950° C. Examples of such materials are silver, platinum, lanthanum-strontium-manganite complexes, silver/palladium mixtures, and mixtures of silver/palladium and the lanthanum complexes. The electrode material is generally dispersed in a suitable liquid carrier to form a paste or ink and then applied in suitable fashion by, for example, brush coating or dip coating. Alternatively, the materials can be applied in powder form, such as a particulate mixture of silver and palladium, and the honeycomb structure then heated to a temperature sufficient to sinter or to melt and alloy the powders. Preferably the electrode material is applied after the composite honeycomb itself has been sintered, but application of the electrode material in powdered form can, in appropriate cases, take place just prior to sintering so that the sintering of the ceramic and the sintering or melting/alloying of the electrical coating can take place in a single operation.

What is claimed is:

1. A method for the preparation of a ceramic honeycomb substrate having selectively sealed channels comprising:
   (a) providing a dried green ceramic honeycomb body having an inlet face and an outlet face and a plurality of substantially parallel open channels, separated from each other by partition walls, extending through the honeycomb between said faces;
   (b) wetting with water the inlet face and the outlet face;
   (c) applying a still-wet as formed, substantially flat, green ceramic, cap body against each of said wetted faces to form a substantially integral end cap over each of said faces whereby the channel openings therein are sealed;
   (d) exposing the openings of given channels at said inlet face through the end cap thereon and exposing the openings of the remaining channels at said outlet face through the end cap thereon; and
   (e) firing said honeycomb body and end caps.

2. The method of claim 1 in which said green ceramic honeycomb body contains 100–400 open channels per square inch of inlet face surface area.

3. The method of claim 1 in which the ceramic material of said green honeycomb body and the ceramic material of said substantially flat green cap bodies are the same.

4. The method of claim 3 in which said ceramic material is zirconia, alumina, cordierite, mullite or titania.

5. The method of claim 4 in which the ceramic material is zirconia, mullite, or β-alumina.

6. The method of claim 5 including the further step of providing an electrically-conductive coating to said inlet face and the interior walls of said inlet-exposed channels to form a first electrode surface, and providing an electrically-conductive coating to said outlet face and the interior walls of said outlet-exposed channels to provide a second, separate electrode surface.

7. The method of claim 1 in which said exposing step comprises imaging analysis.

8. The method of claim 1 in which said end caps and said partition walls are of about equal thickness.

9. The method of claim 8 in which said exposing step comprises imaging analysis.

10. The method of claim 9 including the further step of providing an electrically-conductive coating to said inlet face and the interior walls of said inlet-exposed channels to form a first electrode surface, and providing an electrically-conductive coating to said outlet face and the interior walls of said outlet-exposed channels to provide a second, separate electrode surface.

11. The method of claim 1 wherein the still-wet material of said cap body has a moisture content of about 10–13% by weight.

* * * * *

UNITED STATES PATENT AND TRADEMARK OFFICE
CERTIFICATE OF CORRECTION

PATENT NO. : 5,062,911
DATED : November 5, 1991
INVENTOR(S) : Leslie E. Hampton and David F. Thompson It is certified that error appears in the above-identified patent and that said Letters Patent is hereby corrected as shown below:

Column 5, line 15, -- ceranuc --
should read -- ceramic --.

Column 6, line 43, -- a -- should
read -- as --.

Signed and Sealed this

Ninth Day of November, 1993

Attest:

BRUCE LEHMAN

Attesting Officer     Commissioner of Patents and Trademarks